US012592487B2

(12) United States Patent
Suzuki

(10) Patent No.: US 12,592,487 B2
(45) Date of Patent: Mar. 31, 2026

(54) ANTENNA DEVICE

(71) Applicant: Sony Group Corporation, Tokyo (JP)

(72) Inventor: Yuichiro Suzuki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 30 days.

(21) Appl. No.: 18/841,701

(22) PCT Filed: Jan. 31, 2023

(86) PCT No.: PCT/JP2023/002963
§ 371 (c)(1),
(2) Date: Aug. 27, 2024

(87) PCT Pub. No.: WO2023/171180
PCT Pub. Date: Sep. 14, 2023

(65) Prior Publication Data

US 2025/0167451 A1 May 22, 2025

(30) Foreign Application Priority Data

Mar. 8, 2022 (JP) ................................ 2022-035203

(51) Int. Cl.
*H01Q 1/24* (2006.01)
*H01Q 9/04* (2006.01)
*H01Q 1/22* (2006.01)

(52) U.S. Cl.
CPC ........... *H01Q 9/0407* (2013.01); *H01Q 1/243* (2013.01); *H01Q 1/2266* (2013.01)

(58) Field of Classification Search
CPC ...... H01Q 1/243; H01Q 1/421; H01Q 1/2266; H01Q 9/0407; H01Q 13/06; H01Q 19/10;
(Continued)

(56) References Cited

U.S. PATENT DOCUMENTS 5,771,445 A * 6/1998 Harano .................... H01Q 7/00 455/269
6,087,990 A * 7/2000 Thill ...................... H01Q 21/28 343/700 MS
(Continued)

FOREIGN PATENT DOCUMENTS

JP 2020-127196 A 8/2020

OTHER PUBLICATIONS

International Search Report and Written Opinion mailed on Apr. 11, 2023, received for PCT Application PCT/JP2023/002963, filed on Jan. 31, 2023, 09 pages including English Translation.

*Primary Examiner* — Tung X Le
(74) *Attorney, Agent, or Firm* — XSENSUS LLP

(57) ABSTRACT

A device includes a first metal plate and a second metal plate. The first metal plate is arranged to cover at least part of a first side surface in a longitudinal direction of an antenna module having a main radiation unit of substantially rectangular shape. The second metal plate is arranged to cover at least part of a second side surface in the longitudinal direction of the antenna module, the second side surface being different from the first side surface. The antenna module is arranged so that the main radiation unit faces a high dielectric constant member of a housing. A first distance (d3) between an end side of the first metal plate and the high dielectric constant member is smaller than a distance (d2) between the main radiation unit and the high dielectric constant member. A second distance (d3) is smaller than the distance (d2).

12 Claims, 15 Drawing Sheets

(58) Field of Classification Search
CPC ...... H01Q 21/08; H01Q 21/065; H01Q 21/24; H01Q 25/001
See application file for complete search history.

(56) References Cited

U.S. PATENT DOCUMENTS

| | | | | |
|---|---|---|---|---|
| 6,118,405 | A * | 9/2000 | Mckinnon | H01Q 21/065 343/700 MS |
| 10,847,884 | B2 * | 11/2020 | Chou | H01Q 5/50 |
| 2018/0076530 | A1 * | 3/2018 | Kawahata | H01Q 13/28 |
| 2019/0312347 | A1 | 10/2019 | Edwards et al. | |

* cited by examiner

ANTENNA DEVICE

CROSS-REFERENCE TO RELATED APPLICATIONS

The present application is based on PCT filing PCT/JP2023/002963, filed Jan. 31, 2023, which claims priority from Japanese Patent Application No. 2022-035203, filed Mar. 8, 2022, the entire contents of each are incorporated herein by reference.

FIELD

The present disclosure relates to a device.

BACKGROUND

A technology has been spreading to mount an antenna module having a plurality of patch antennas on a mobile terminal such as a smartphone. For example, a terminal device having a back surface on which an antenna module with four patch antennas arranged in line is mounted is known (e.g., see Patent Literature 1).

CITATION LIST

Patent Literature

Patent Literature 1: JP 2020-127196 A

SUMMARY

Technical Problem

In the technology described above, radio waves of the antenna module are radiated from the back surface of the terminal device. At this time, for example, in a case where the back surface of the terminal device is made of a high dielectric constant member such as glass, there is a problem that a radiation gain of the antenna module is degraded due to reflection or loss caused by the high dielectric constant member.

Therefore, the present disclosure provides a device that is configured to further suppress degradation in the radiation gain of an antenna module.

Note that the above problem or object is merely one of a plurality of problems or objects that can be solved or achieved by a plurality of embodiments disclosed herein.

Solution to Problem

A device of the present disclosure includes a first metal plate and a second metal plate. The first metal plate is arranged to cover at least part of a first side surface in a longitudinal direction of an antenna module having a main radiation unit of substantially rectangular shape. The second metal plate is arranged to cover at least part of a second side surface in the longitudinal direction of the antenna module, the second side surface being different from the first side surface. The antenna module is arranged so that the main radiation unit faces a high dielectric constant member of a housing. A first distance between an end side of the first metal plate and the high dielectric constant member is smaller than a distance between the main radiation unit and the high dielectric constant member. A second distance between an end side of the second metal plate and the high dielectric constant member is smaller than the distance between the main radiation unit and the high dielectric constant member.

DESCRIPTION OF EMBODIMENTS

Figure 1:
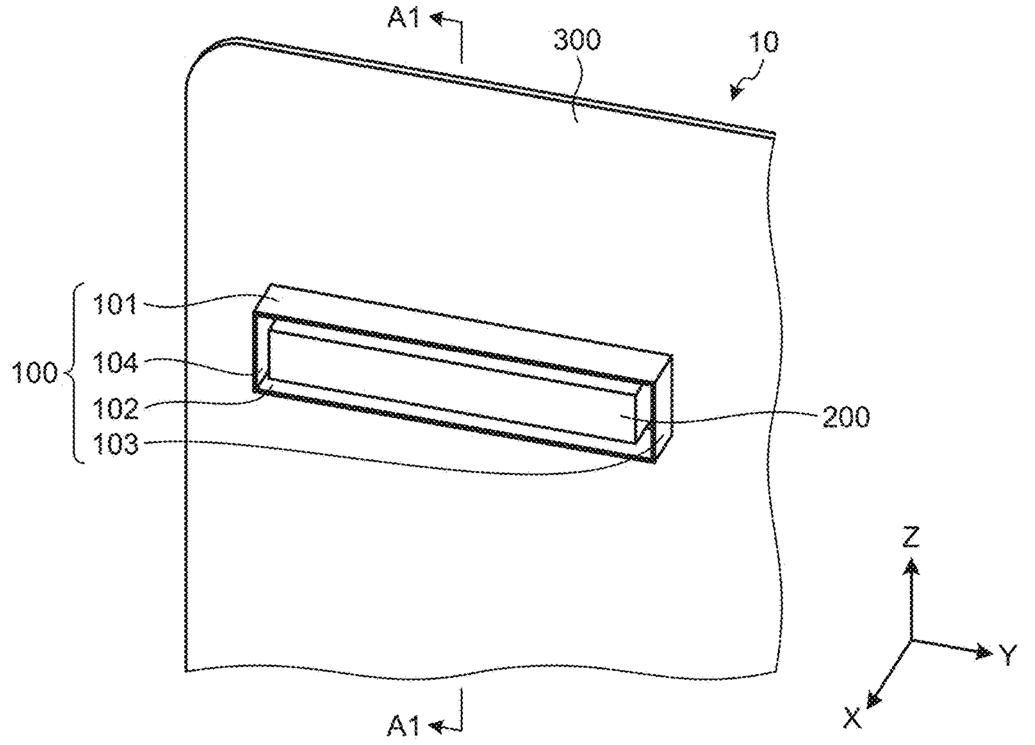
FIG. 1 is a diagram illustrating an exemplary schematic configuration of a wireless device according to a first embodiment of the present disclosure.

Embodiments of the present disclosure will be described in detail below with reference to the accompanying drawings. Note that in the present description and the drawings, substantially the same elements are denoted by the same reference numerals, and redundant description thereof will be omitted.

Furthermore, in the present description and the drawings, indication and description of specific values are merely examples, and other values may be applied.

One or a plurality of embodiments (including examples and modifications) described below can be implemented independently. Meanwhile, at least some of the plurality of embodiments described below may be implemented by being appropriately combined with at least some of the other embodiments. The plurality of embodiments can include novel features different from each other. Therefore, the plurality of embodiments can contribute to solving different objects or problems, and can have different effects.

1. FIRST EMBODIMENT

Figure 2:
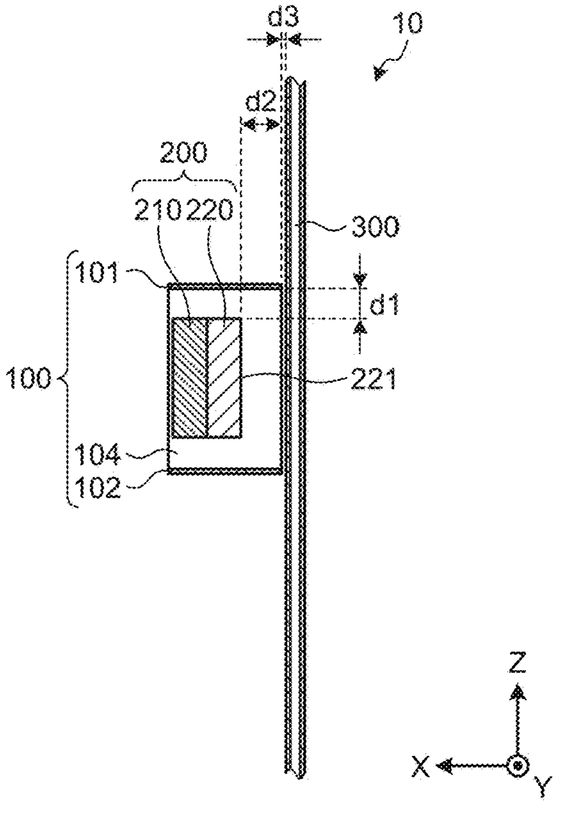
FIG. 2 is a cross-sectional view taken along line A1-A1 of FIG. 1.

FIG. 1 is a diagram illustrating an exemplary schematic configuration of a wireless device 10 according to a first embodiment of the present disclosure. FIG. 2 is a cross-sectional view taken along line A1-A1 of FIG. 1. Note that, hereinafter, XYZ coordinates are illustrated in the drawings. An X-axis direction corresponds to a thickness direction of the wireless device 10. In a Y-axis direction and a Z-axis direction, the Z-axis direction corresponds to the thickness direction of the wireless device 10.

In the following description, for convenience, of the appearance surfaces constituting the wireless device 10, a surface on which a screen (display) is provided may be referred to as a "front surface", and, of the appearance surfaces constituting the wireless device 10, a surface opposite to the front surface may be referred to as a "back surface". In addition, in the following description, a side on which the "front surface" is positioned relative to the inside of the wireless device 10 may be referred to as a "front surface side", and a side on which the "back surface" is positioned relative to the inside of the wireless device 10 may be referred to as a "back surface side".

The wireless device 10 is, for example, a mobile terminal device such as a smartphone or a tablet computer. Alternatively, the wireless device 10 may be a mobile body such as a drone, or a terminal device such as a laptop personal computer (PC). Hereinafter, for ease of description, the wireless device 10 is a smartphone.

The wireless device 10 illustrated in FIG. 1 includes a high dielectric constant member 300, an antenna module 200, and a metal member 100.

(High Dielectric Constant Member 300)

The wireless device 10 includes a housing, part of which is formed of the high dielectric constant member 300. In the example of FIG. 1, the back surface of the wireless device 10 is formed of the high dielectric constant member 300. The other part of the housing than the back surface, for example, a side surface of the wireless device 10 can be formed of a member such as a metal other than glass.

For example, the high dielectric constant member 300 illustrated in FIG. 1 is glass. In a case where the high dielectric constant member 300 is made of glass, the high dielectric constant member 300 has a relative dielectric constant of approximately "7", and the relative dielectric constant is higher than that of the back surface made of, for example, a resin.

(Antenna Module 200)

The antenna module 200 is a module for wireless communication with another wireless device. The antenna module 200 includes a control unit 210 and an antenna unit 220. The control unit 210 includes a so-called radio frequency integrated circuit (RFIC).

Figure 3:
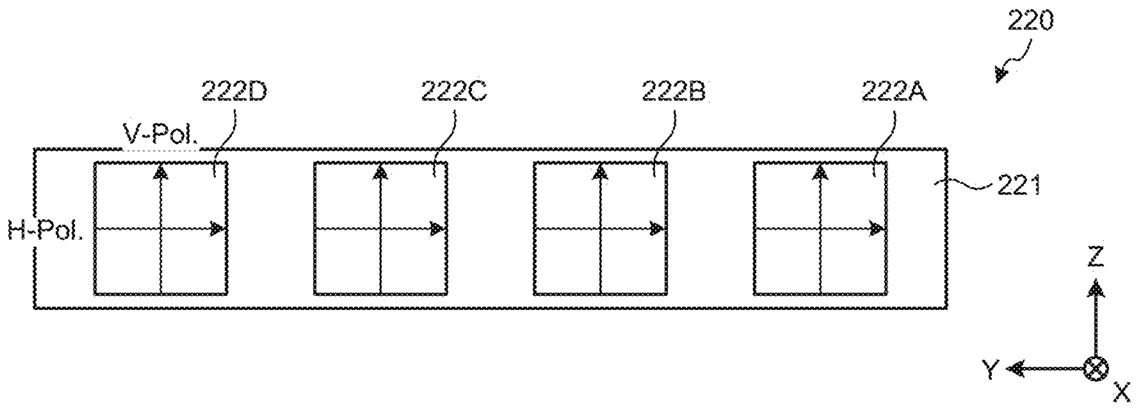
FIG. 3 is a diagram illustrating an example of an antenna unit according to the first embodiment of the present disclosure.

FIG. 3 is a diagram illustrating an example of the antenna unit 220 according to the first embodiment of the present disclosure. FIG. 3 illustrates the antenna unit 220 as viewed from a negative X-axis direction illustrated in FIG. 1. In other words, FIG. 3 illustrates the antenna unit 220 as viewed from the side of the high dielectric constant member 300.

The antenna unit 220 includes, for example, a main radiation unit 221 including a plurality of patch antennas 222. FIG. 3 illustrates an example of the antenna unit 220 including four patch antennas 222A to 222D, but the number of the patch antennas 222 is not limited to four. The number of the patch antennas 222 may be three or less, or may be five or more.

In the example of FIG. 3, the patch antennas 222A to 222D are arranged in line in a longitudinal direction (Y-axis direction) of the antenna unit 220. In each of the patch antennas 222A to 222D, power is supplied to a side parallel to the Z-axis direction and a side parallel to the Y-axis direction.

Each of the patch antennas 222A to 222D transmits and receives a signal of a polarized wave parallel to the Z axis (hereinafter, also described as a vertically polarized wave). Each of the patch antennas 222A to 222D transmits and receives a signal of a polarized wave parallel to the Y axis (hereinafter, also described as a horizontally polarized wave).

Note that, here, a polarization direction of each of the patch antennas 222 is merely an example, and is not limited to the example of FIG. 3. In addition, each patch antenna 222 may be configured to transmit and receive the signal of one of the vertically polarized wave and the horizontally polarized wave.

Furthermore, here, the antenna unit 220 includes the patch antennas 222, but the antenna of the antenna unit 220 is not limited to the patch antennas 222. The antenna unit 220 is preferably configured to radiate a radio wave from the main radiation unit 221 to the outside via the high dielectric constant member 300. For example, the antenna unit 220 may include a linear antenna. Furthermore, the patch antennas 222 do not need to be exposed outside the antenna unit 220, and may be covered with, for example, a dielectric (not illustrated) or the like.

As illustrated in FIG. 2, the control unit 210 is arranged on a surface of the antenna unit 220 opposite from the main radiation unit 221 (the front surface side of the wireless device 10). The control unit 210 is electrically connected to the plurality of patch antennas 222 to control driving of the patch antennas 222. For example, the control unit 210 is shielded to suppress electrical interference with the antenna unit 220.

Note that, in FIG. 2, the control unit 210 is mounted on the surface of the antenna unit 220 opposite from the main radiation unit 221, but the arrangement of the control unit 210 is not limited thereto. The control unit 210 can be arranged at a place away from the antenna unit 220. In this configuration, the antenna module 200 can include the antenna unit 220. Furthermore, the control unit 210 and the antenna unit 220 can be connected to each other by using, for example, a flexible substrate or the like.

The antenna module 200 of the present embodiment transmits and/or receives a signal in a millimeter-wave band. The millimeter-wave band is a frequency band of 30 GHz to 300 GHz.

In another example, a frequency band used for wireless communication by the antenna module 200 may be a frequency band of 28 GHZ (n257 and n261), 39 GHZ (n260), or 40 GHz or more. The frequency band used is not limited to the millimeter-wave band. The frequency band used may be, for example, a terahertz wave band which is a frequency band of 0.1 to 100 THz.

(Metal Member 100)

As illustrated in FIGS. 1 and 2, the wireless device 10 includes the metal member 100 that surrounds the antenna module 200. The metal member 100 includes metal plates 101 to 104. Each of the metal plates 101 to 104 is, for example, a plate made of a metal such as copper, aluminum, or iron.

The metal plate 101 (an example of a first metal plate) has a substantially rectangular shape. The metal plate 101 is arranged to cover a side surface (an example of a first side surface) in the longitudinal direction of the antenna module 200. The metal plate 101 has a size larger than the area of the side surface in the longitudinal direction of the antenna module 200. In the example of FIG. 2, the metal plate 101 is arranged substantially parallel to the side surface in the longitudinal direction of the antenna module 200, apart therefrom by a distance d1.

The metal plate 101 is arranged substantially perpendicular to the high dielectric constant member 300. The metal plate 101 is arranged so that a distance between an end side on the back surface side and the high dielectric constant member 300 has a distance d3. The distance d3 is smaller than a distance d2 between the main radiation unit 221 of the antenna module 200 and the high dielectric constant member 300. In other words, the metal plate 101 is arranged closer to the high dielectric constant member 300 than the antenna module 200.

The metal plate 102 (an example of a second metal plate) has a substantially rectangular shape. The metal plate 102 is arranged to face the metal plate 101 across the antenna module 200. The metal plate 102 is arranged to cover a side surface (an example of a second side surface) in the longitudinal direction of the antenna module 200. The metal plate 102 has a size larger than the area of the side surface in the longitudinal direction of the antenna module 200. The metal plate 102 is arranged substantially parallel to the side surface in the longitudinal direction of the antenna module 200, apart therefrom by the distance d1 (not illustrated).

The metal plate 102 is arranged substantially perpendicular to the high dielectric constant member 300. The metal plate 102 is arranged so that a distance between an end side on the back surface side and the high dielectric constant member 300 has the distance d3. The distance d3 is smaller than a distance d2 between the main radiation unit 221 of the antenna module 200 and the high dielectric constant member 300. In other words, the metal plate 102 is arranged closer to the high dielectric constant member 300 than the antenna module 200.

The metal plate 103 (an example of a fifth metal plate) has a substantially rectangular shape. The metal plate 103 is arranged to cover a side surface (an example of a third side surface) in a transverse direction of the antenna module 200. The metal plate 103 has a size larger than the area of the side surface in the transverse direction of the antenna module 200. The metal plate 103 is arranged substantially parallel to the side surface in the transverse direction of the antenna module 200, apart therefrom by the distance d1 (not illustrated).

The metal plate 103 is arranged substantially perpendicular to the high dielectric constant member 300. The metal plate 103 is arranged so that a distance between an end side on the back surface side and the high dielectric constant member 300 has the distance d3. The distance d3 is smaller than a distance d2 between the main radiation unit 221 of the antenna module 200 and the high dielectric constant member 300. In other words, the metal plate 103 is arranged closer to the high dielectric constant member 300 than the antenna module 200.

The metal plate 104 (an example of a seventh metal plate) has a substantially rectangular shape. The metal plate 104 is arranged to face the metal plate 103 across the antenna module 200. The metal plate 104 is arranged to cover a side surface (an example of a fourth side surface) in the transverse direction of the antenna module 200. The metal plate 104 has a size larger than the area of the side surface in the transverse direction of the antenna module 200. The metal plate 104 is arranged substantially parallel to the side surface in the transverse direction of the antenna module 200, apart therefrom by the distance d1 (not illustrated).

The metal plate 104 is arranged substantially perpendicular to the high dielectric constant member 300. The metal plate 103 is arranged so that a distance between an end side on the back surface side and the high dielectric constant member 300 has the distance d3. The distance d3 is smaller than a distance d2 between the main radiation unit 221 of the antenna module 200 and the high dielectric constant member 300. In other words, the metal plate 104 is arranged closer to the high dielectric constant member 300 than the antenna module 200.

The metal plate 103 has one side that is connected to one side of the metal plate 101. The metal plate 103 has the other side that is connected to one side of the metal plate 102. The metal plate 104 has one side that is connected to the other side of the metal plate 101. The metal plate 104 has the other side that is connected to the other side of the metal plate 102. In this way, the metal member 100 has a cylindrical shape. The antenna module 200 is arranged in the cylindrical shape of the metal member 100. The metal plates 101 to 104 may be integrally formed, or may be formed as separate metal plates.

The metal member 100 provided around the antenna module 200 makes it possible for the wireless device 10 to suppress the degradation in the radiation gain of the antenna module 200. This configuration will be described with reference to FIGS. 4 and 5.

Figure 4:
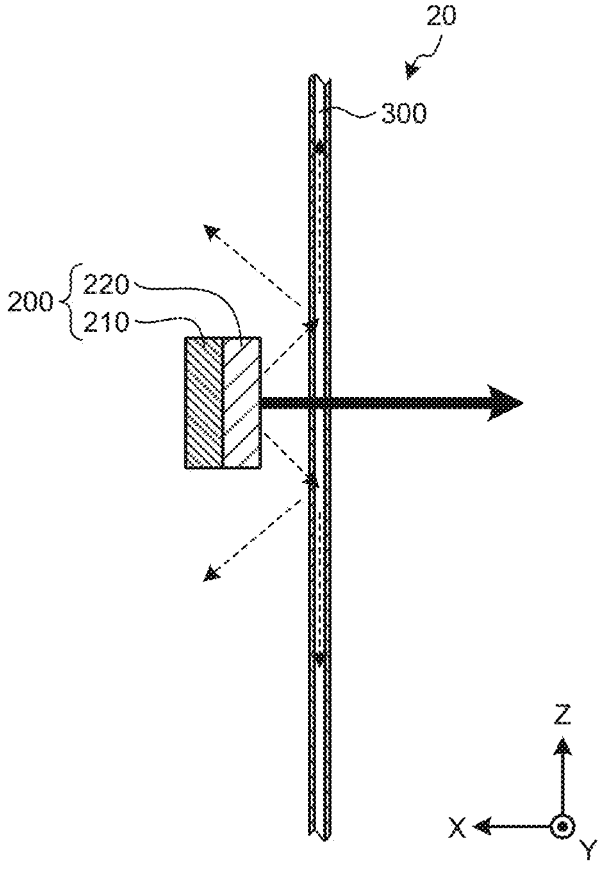
FIG. 4 is a diagram illustrating an exemplary schematic configuration of a wireless device.

FIG. 4 is a diagram illustrating an exemplary schematic configuration of a wireless device 20. The wireless device 20 has the same configuration as that of the wireless device 10 illustrated in FIGS. 1 and 2 except that the metal member 100 is not provided.

A radio wave radiated from the antenna module 200 is radiated outside the wireless device 20 mainly through the high dielectric constant member 300, as indicated by a solid arrow in FIG. 4. Meanwhile, as indicated by dotted arrows in FIG. 4, part of the radio wave is reflected on the surface of the high dielectric constant member 300 or propagated in the high dielectric constant member 300, with no radiation outside the wireless device 20.

In particular, an amount of power of the radio wave propagated in the high dielectric constant member 300 increases in proportion to the relative dielectric constant of the high dielectric constant member 300. For example, as described above, it is assumed that the high dielectric constant member 300 is made of glass and has a relative dielectric constant of approximately "7". In this configuration, a radio wave having a larger amount of power propagates in the back surface (high dielectric constant member 300) of the wireless device 20, as compared with the back surface of the wireless device 20 formed of a resin having a small relative dielectric constant.

In this way, the radio waves radiated from the antenna module 200 are not entirely radiated outside the wireless device 20, and some of the radio waves propagate inside the wireless device 20 and inside the high dielectric constant member 300. As a result, the radiation gain of the antenna module 200 is degraded.

Table 1 is an example of a table showing the length of the wavelength at each frequency.

TABLE 1

| | | ¼ wavelength [mm] | | |
|---|---|---|---|---|
| Band | Frequency | Free space | Relative dielectric constant 3.5 | Relative dielectric constant 7 |
| LTE | 800 MHz | 93.7 | 50.1 | 35.4 |
| | 2 GHz | 37.5 | 20.0 | 14.2 |
| Wireless LAN | 2.4 GHz | 31.2 | 16.7 | 11.8 |
| | 5 GHz | 15.0 | 8.0 | 5.7 |
| 5G mmW | 28 GHz | 2.7 | 1.4 | 1.0 |
| | 39 GHz | 1.9 | 1.0 | 0.7 |

As shown in Table 1, when the frequency is 800 MHz, the length of ¼ the wavelength (¼ wavelength) in free space is approximately 93.7 mm. The length of ¼ the wavelength in a space having a low relative dielectric constant (e.g., relative dielectric constant is "3.5"), for example, as in a resin, is approximately 50.1 mm. In addition, the length of ¼ the wavelength in a space having a high relative dielectric constant of "7", as in the high dielectric constant member 300, is approximately 35.4 mm. A frequency of 800 MHZ is a frequency used for, for example, Long Term Evolution (LTE).

When the frequency is 2.5 GHZ, the length of ¼ the wavelength (¼ wavelength) in the free space is approximately 31.2 mm. The length of ¼ the wavelength in the space having a low relative dielectric constant (e.g., relative dielectric constant is "3.5"), for example, as in the resin, is approximately 16.7 mm. In addition, the length of ¼ the wavelength in the space having a high relative dielectric constant of "7", as in the high dielectric constant member 300, is approximately 11.8 mm. A frequency of 2.5 GHz is a frequency used for, for example, a wireless LAN (e.g., WiFi (registered trademark)).

When the frequency is 39 GHZ, the length of ¼ the wavelength (¼ wavelength) in the free space is approximately 1.9 mm. The length of ¼ the wavelength in the space having a low relative dielectric constant (e.g., relative dielectric constant is "3.5"), for example, as in the resin, is approximately 1.0 mm. In addition, the length of ¼ the wavelength in the space having a high relative dielectric constant of "7", as in the high dielectric constant member 300, is approximately 0.7 mm. A frequency of 39 GHz is a frequency used for, for example, a 5G millimeter-wave band (mmW).

In this way, the wavelength decreases as the frequency increases. In addition, the wavelength decreases as the relative dielectric constant increases.

Here, it is assumed that the high dielectric constant member 300 has a thickness of, for example, approximately 0.6 mm. When the operation frequency of the antenna module 200 is 800 MHZ, the length of ¼ the wavelength in the space having a relative dielectric constant of "7" is 35.4 mm. The length of ¼ the wavelength is sufficiently larger than the thickness (0.6 mm) of the high dielectric constant member 300. Therefore, when the operation frequency of the antenna module 200 is 800 MHZ, the radio wave radiated from the antenna module 200 is hardly affected by the high dielectric constant member 300, and the radiation gain of the antenna module 200 is also hardly degraded.

Meanwhile, when the operation frequency of the antenna module 200 is 39 GHz, the length of ¼ the wavelength in the space having a relative dielectric constant of "7" is 0.7 mm. The length of ¼ the wavelength is closer to the thickness (0.6 mm) of the high dielectric constant member 300. Therefore, when the operation frequency of the antenna module 200 is 39 GHZ, the radio wave radiated from the antenna module 200 is affected by the high dielectric constant member 300, and the radiation gain of the antenna module 200 is degraded.

In this way, the influence of the high dielectric constant member 300 on the radiation gain of the antenna module 200 increases as the operation frequency of the antenna module 200 increases.

Therefore, in the wireless device 10 according to the present embodiment, the metal member 100 is arranged around the antenna module 200 to suppress the degradation in the radiation gain of the antenna module 200, as described above.

Figure 5:
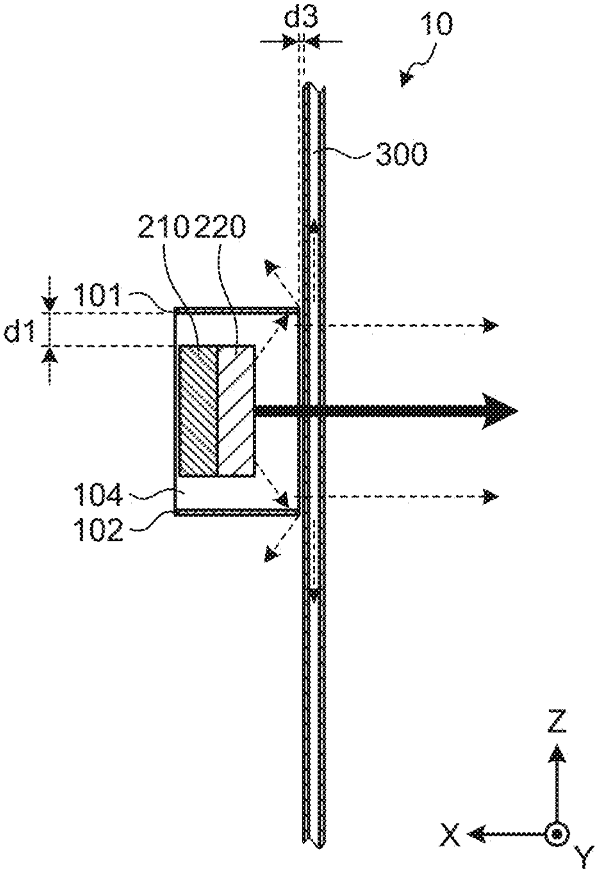
FIG. 5 is a diagram illustrating an example of radiation by an antenna module according to the first embodiment of the present disclosure.

FIG. 5 is a diagram illustrating an example of radiation by the antenna module 200 according to the first embodiment of the present disclosure.

As described above, in the wireless device 10 according to the present embodiment, the metal member 100 is arranged around the antenna module 200. Note that in FIG. 5, the metal plates 101, 102, and 104 of the metal member 100 are illustrated.

As described above, the radio wave radiated from the antenna module 200 is radiated outside the wireless device 10 mainly through the high dielectric constant member 300 (see a solid arrow in FIG. 5). Furthermore, part of the radio wave is reflected by the metal member 100 and emitted outside the wireless device 10. In this way, the radio wave radiated from the antenna module 200 is reflected by the metal member 100 and radiated outside the wireless device 10, allowing the wireless device 10 to suppress degradation in the radiation characteristics of the antenna module 200.

Here, the distance d1 between the metal member 100 and the antenna module 200 and the distance d3 between the metal member 100 and the high dielectric constant member 300 will be described.

As described above, the radio wave radiated from the antenna module 200 is reflected by the metal member 100, and the radio wave is more radiated outside the wireless device 10. Therefore, it is desirable to arrange the metal member 100 closer to the antenna module 200. In other words, as the distance d1 between the metal member 100 and the antenna module 200 decreases, the degradation in the radiation gain of the antenna module 200 is further suppressed. For example, the distance d1 is desirably $\frac{1}{10}$ wavelength or less of the radio wave radiated from the antenna module 200.

As shown in Table 1, when the operation frequency of the antenna module 200 is 28 GHz, the ¼ wavelength of the radio wave radiated from the antenna module 200 is approximately 2.7 mm. In other words, one wavelength of the radio wave is approximately 10.8 mm in this case. Therefore, the distance d1 between the metal member 100 and the antenna module 200 is desirably equal to or less than the 1/10 wavelength, that is, approximately 1 mm or less (e.g., approximately 0.8 mm).

Furthermore, in order to reflect more of the radio wave radiated from the antenna module 200, by the metal member 100, it is desirable to arrange the metal member 100 closer to the high dielectric constant member 300. In other words, as the distance d3 between the metal member 100 and the high dielectric constant member 300 decreases, the degradation in the radiation gain of the antenna module 200 is suppressed. For example, the distance d3 preferably has a small distance, such as approximately 0.1 mm or less, so that an end side of the metal member 100 comes close to (or in contact with) the high dielectric constant member 300.

In this way, the distances d1 and d3 further reduced make it possible for the wireless device 10 to further suppress the degradation in the radiation gain of the antenna module 200.

2. SECOND EMBODIMENT

Figure 6:
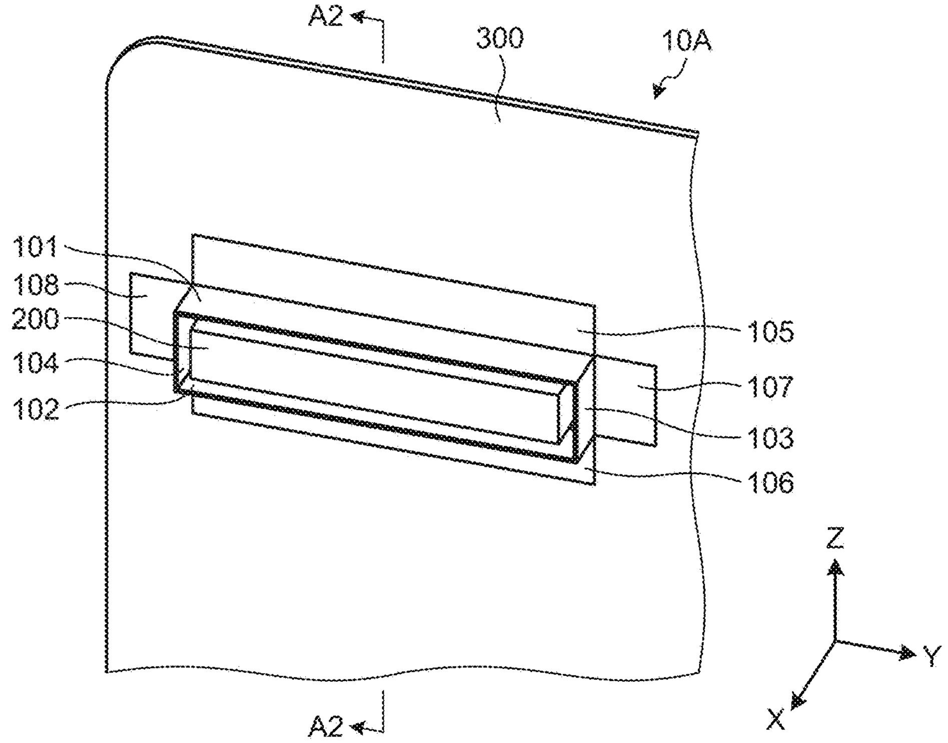
FIG. 6 is a diagram illustrating an exemplary schematic configuration of a wireless device according to a second embodiment of the present disclosure.
Figure 7:
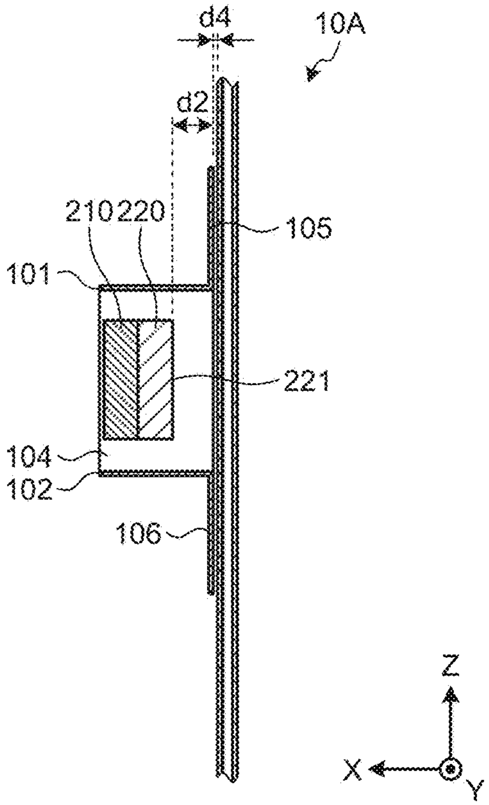
FIG. 7 is a cross-sectional view taken along line A2-A2 of FIG. 6.

FIG. 6 is a diagram illustrating an exemplary schematic configuration of a wireless device 10A according to a second embodiment of the present disclosure. FIG. 7 is a cross-sectional view taken along line A2-A2 of FIG. 6. A metal member 100A of the wireless device 10A according to the present embodiment includes metal plates 105 to 108 in addition to the metal plates 101 to 104.

The metal plate 105 (an example of a third metal plate) is arranged on a side of a side surface (an example of the first side surface) of the periphery of the antenna module 200 so as to be substantially parallel to the high dielectric constant member 300. A distance d4 between the metal plate 105 and the high dielectric constant member 300 is smaller than the distance d2 between the main radiation unit 221 of the antenna module 200 and the high dielectric constant member 300. In the examples of FIGS. 1 and 2, an end side of the metal plate 105 is connected to the end side of the metal plate 101. It can also be said that the metal member 100A according to the present embodiment has a shape in which the metal plate 101 is extended on the back surface side of the wireless device 10A and bent outward from the antenna module 200.

The metal plate 106 (an example of a fourth metal plate) is arranged on a side of a side surface (an example of the second side surface) of the periphery of the antenna module 200 so as to be substantially parallel to the high dielectric constant member 300. The distance d4 between the metal plate 106 and the high dielectric constant member 300 is smaller than the distance d2 between the main radiation unit 221 of the antenna module 200 and the high dielectric constant member 300. In the examples of FIGS. 1 and 2, an end side of the metal plate 106 is connected to the end side of the metal plate 102. It can also be said that the metal member 100A according to the present embodiment has a shape in which the metal plate 102 is extended on the back surface side of the wireless device 10A and bent outward from the antenna module 200.

The metal plate 107 (an example of a sixth metal plate) is arranged on a side of a side surface (an example of the third side surface) of the periphery of the antenna module 200 so as to be substantially parallel to the high dielectric constant member 300. The distance d4 between the metal plate 107 and the high dielectric constant member 300 is smaller than the distance d2 between the main radiation unit 221 of the antenna module 200 and the high dielectric constant member 300. In the examples of FIGS. 1 and 2, an end side of the metal plate 107 is connected to the end side of the metal plate 103. It can also be said that the metal member 100A according to the present embodiment has a shape in which the metal plate 103 is extended on the back surface side of the wireless device 10A and bent outward from the antenna module 200.

The metal plate 108 (an example of an eighth metal plate) is arranged on a side of a side surface (an example of the fourth side surface) of the periphery of the antenna module 200 so as to be substantially parallel to the high dielectric constant member 300. The distance d4 between the metal plate 108 and the high dielectric constant member 300 is smaller than the distance d2 between the main radiation unit 221 of the antenna module 200 and the high dielectric constant member 300. In the examples of FIGS. 1 and 2, an end side of the metal plate 108 is connected to the end side of the metal plate 104. It can also be said that the metal member 100A according to the present embodiment has a shape in which the metal plate 104 is extended on the back surface side of the wireless device 10A and bent outward from the antenna module 200.

Note that in the examples of FIGS. 6 and 7, the distance d4 between each of the metal plates 105 to 108 and the high dielectric constant member 300 is the same as the distance d3 between each of the end sides of the metal plates 101 to 108 and the high dielectric constant member 300.

Figure 8:
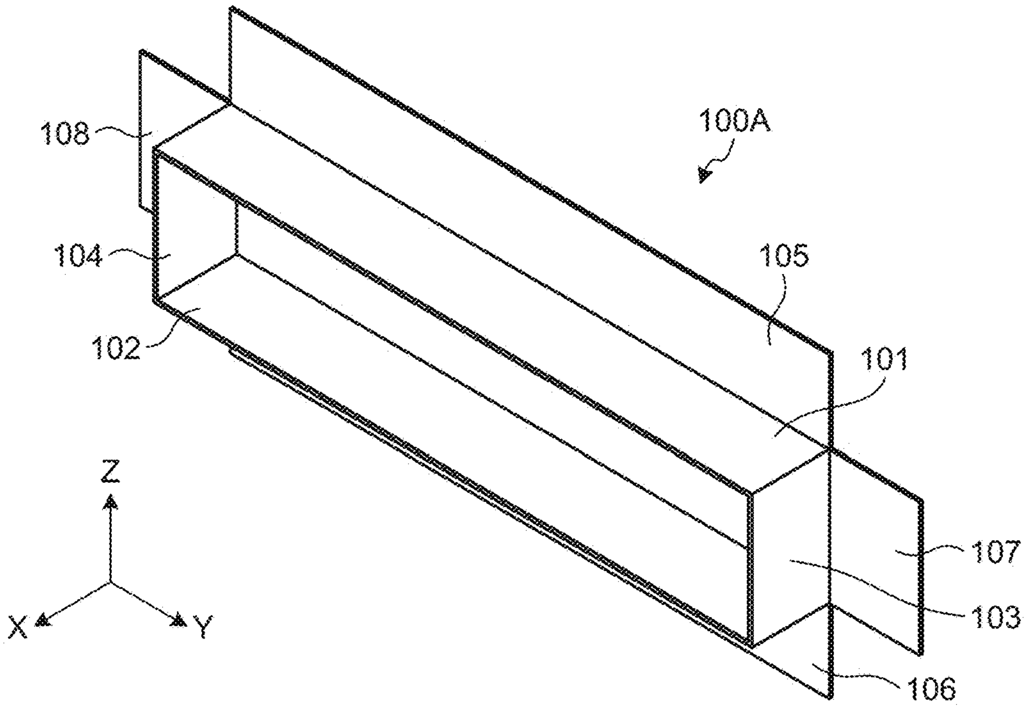
FIG. 8 is a schematic diagram illustrating an example of a metal member according to the second embodiment of the present disclosure.
Figure 9:
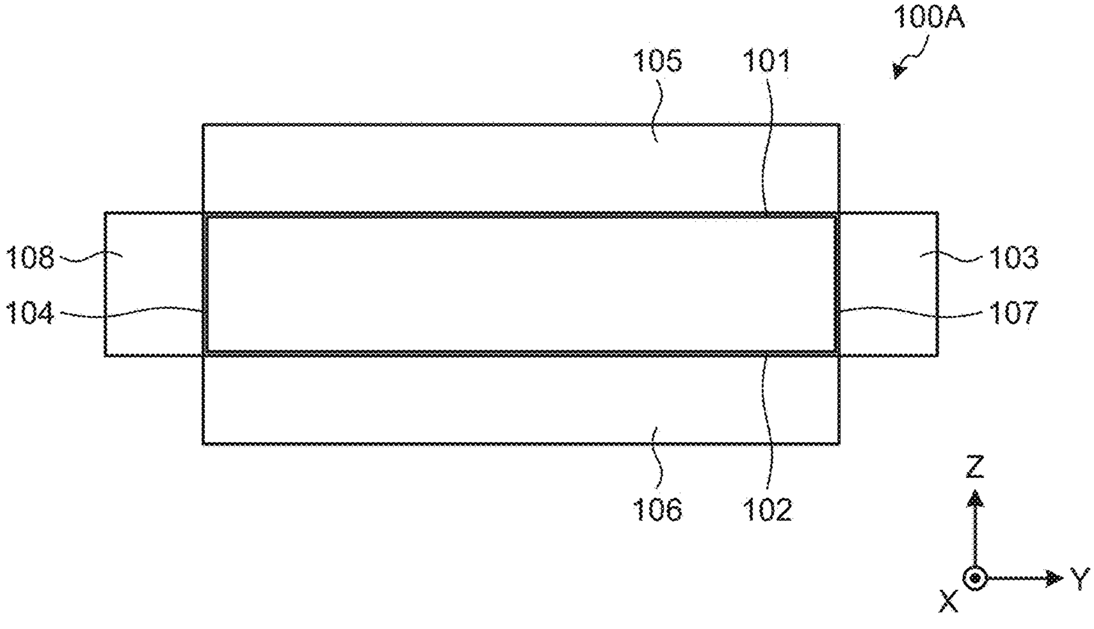
FIG. 9 is a schematic diagram illustrating an example of the metal member according to the second embodiment of the present disclosure.
Figure 10:
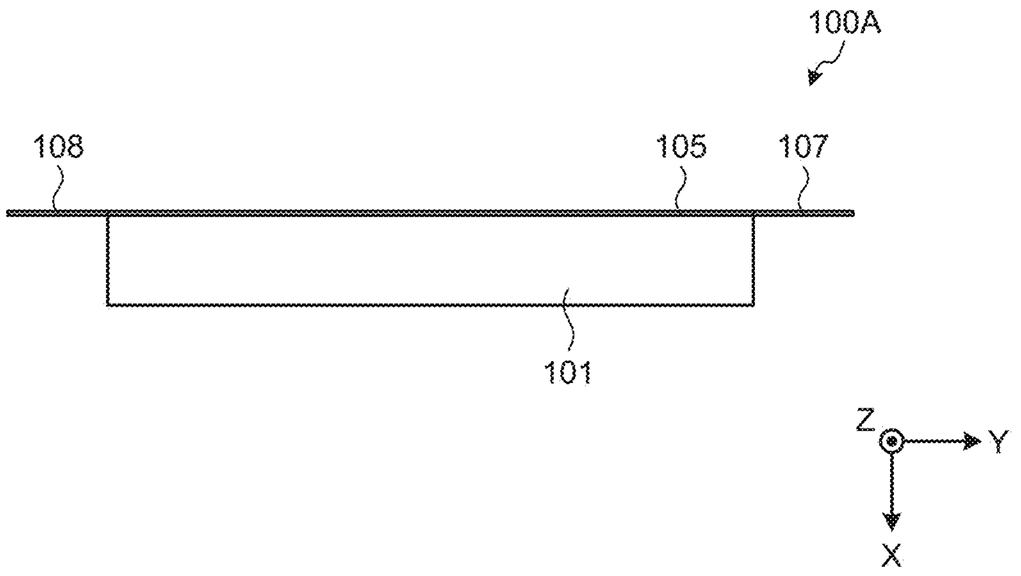
FIG. 10 is a schematic diagram illustrating an example of the metal member according to the second embodiment of the present disclosure.
Figure 11:
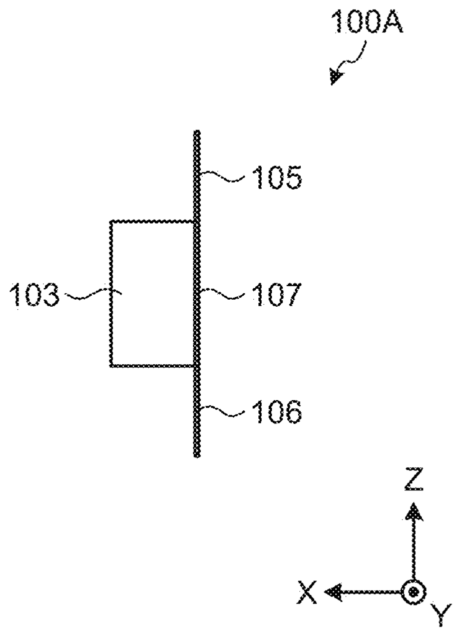
FIG. 11 is a schematic diagram illustrating an example of the metal member according to the second embodiment of the present disclosure.

FIGS. 8 to 11 are each a schematic diagram illustrating an example of a metal member 100A according to the second embodiment of the present disclosure. FIG. 8 is a perspective view of the metal member 100A. FIG. 9 is a front view of the metal member 100A as viewed from a positive X-axis direction. FIG. 10 is a side view of the metal member 100A as viewed from a positive Z-axis direction. FIG. 11 is a side view of the metal member 100A as viewed from a positive Y-axis direction.

Each of the metal plates 105 to 108 of the present embodiment is, for example, a plate formed of a metal such as copper, aluminum, or iron. Each of the metal plates 105 to 108 has a substantially rectangular shape. The metal plates 105 to 108 are arranged substantially perpendicular to the metal plates 101 to 104, respectively. As described above, the metal plates 101 to 104 are arranged into a cylindrical shape. The metal plates 105 to 108 are arranged around an opening portion formed by the metal plates 101 to 104 on the high dielectric constant member 300 side (negative X-axis direction side).

The metal plates 101 to 108 can be formed of the same metal. In this configuration, the metal plates 101 to 108 can be integrally formed. The metal plates 101 to 108 can be formed of different metals. In this configuration, for example, the metal plates 101 to 108 may be separately formed. For example, the metal plates 101 to 104 can be integrally formed of the same metal, and each of the metal plates 105 to 108 can be formed of a metal different from that of the metal plates 101 to 104.

Figure 12:
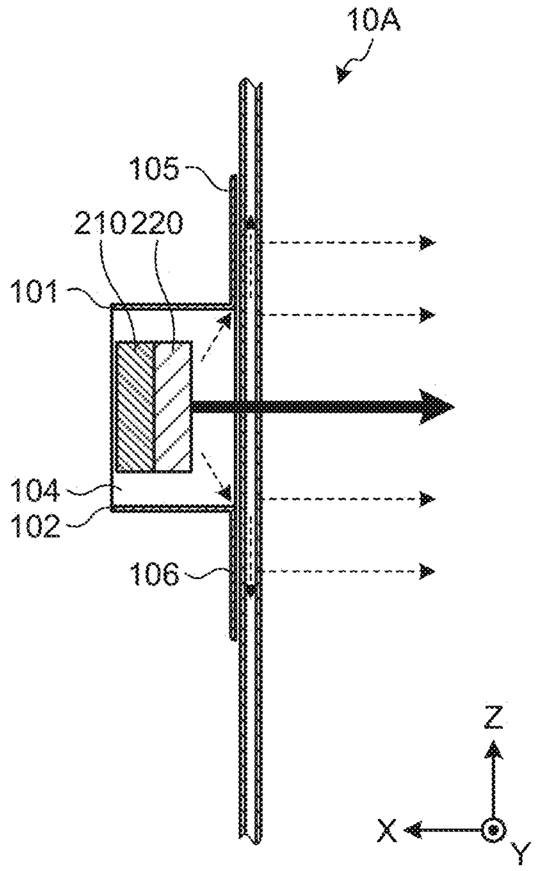
FIG. 12 is a diagram illustrating an example of radiation by the antenna module according to the second embodiment of the present disclosure.

The metal member 100A including the metal plates 105 to 108 makes it possible for the wireless device 10A to further suppress the degradation in the radiation gain of the antenna module 200. This point will be described with reference to FIGS. 5 and 12. FIG. 12 is a diagram illustrating an example of radiation by the antenna module according to the second embodiment of the present disclosure.

As described above with reference to FIG. 5, arrangement of the metal member 100 around the antenna module 200 reflects the radio wave radiated from the antenna module 200 on the metal member 100, increasing the radio wave radiated outside the wireless device 10. As a result, the wireless device 10 is configured to suppress the degradation in the radiation gain of the antenna module 200.

However, the metal member 100 serves as a knife edge, and diffraction occurs at the end sides of the metal member 100. As a result, some of the radio waves propagate inside the high dielectric constant member 300 and inside the housing of the wireless device 10.

Therefore, as illustrated in FIG. 12, in the metal member 100A of the present embodiment, the metal plates 105 to 108 are arranged around the metal plates 101 to 104. In the metal member 100A, the metal plates 105 to 108 are configured to suppress turning of the radio wave due to diffraction at the end sides of the metal plates 101 to 104. As a result, the wireless device 10A is configured to reduce the radio waves propagating inside the high dielectric constant member 300 and inside the housing of the wireless device 10, and more radio waves are radiated outside the wireless device 10A.

In this way, the wireless device 10A of the present embodiment includes the metal member 100A, reducing reduce the degradation in the radiation gain of the antenna module 200.

Figure 13:
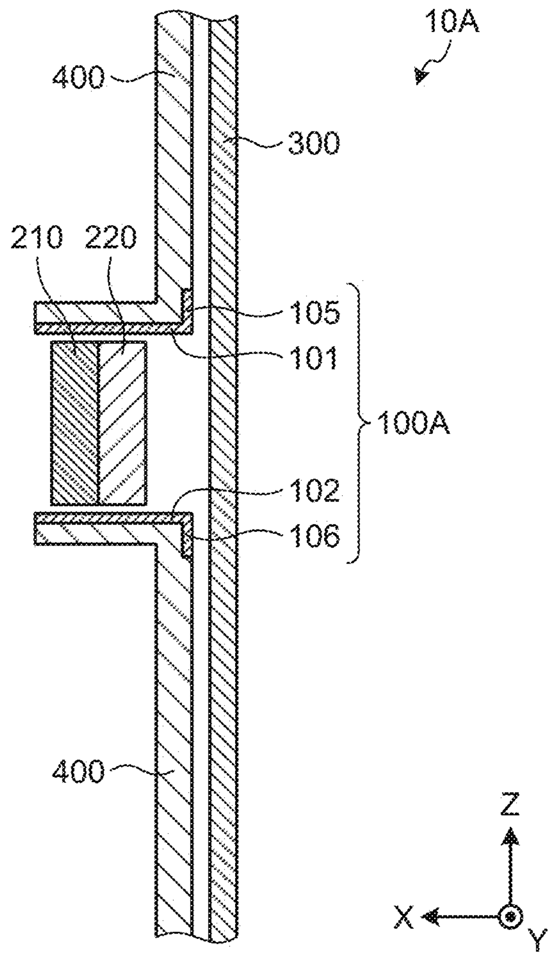
FIG. 13 is a schematic diagram illustrating an example of the wireless device according to the second embodiment of the present disclosure.

FIG. 13 is a schematic diagram illustrating an example of the wireless device 10A according to the second embodiment of the present disclosure. The wireless device 10A illustrated in FIG. 13 includes a frame 400 for mounting the metal member 100A, in addition to the configuration of the wireless device 10A illustrated in FIG. 6.

The metal member 100A is formed as, for example, a cylindrical box made of copper. The frame 400 is formed of, for example, plastic. Furthermore, a cylindrical hole (cavity) for mounting the antenna module 200 on the wireless device 10A and a recess for mounting the metal member 100A are formed in the frame 400.

The metal member 100A formed as a cylindrical box is mounted in the recess in the frame 400 so as to be arranged to cover the periphery of the antenna module 200.

Here, the metal member 100A is formed as the box made of copper and mounted to the frame 400, but a method of forming the metal member 100A is not limited thereto. The metal member 100A can be formed directly on the frame 400 by using, for example, a three-dimensional wiring technology such as laser direct structuring/laser direct structuring (LDS).

As a result, the metal plates 101 to 108 of the metal member 100A are integrally formed. Note that the metal plates 101 to 104 of the wireless device 10 according to the first embodiment can be similarly formed.

Figure 14:
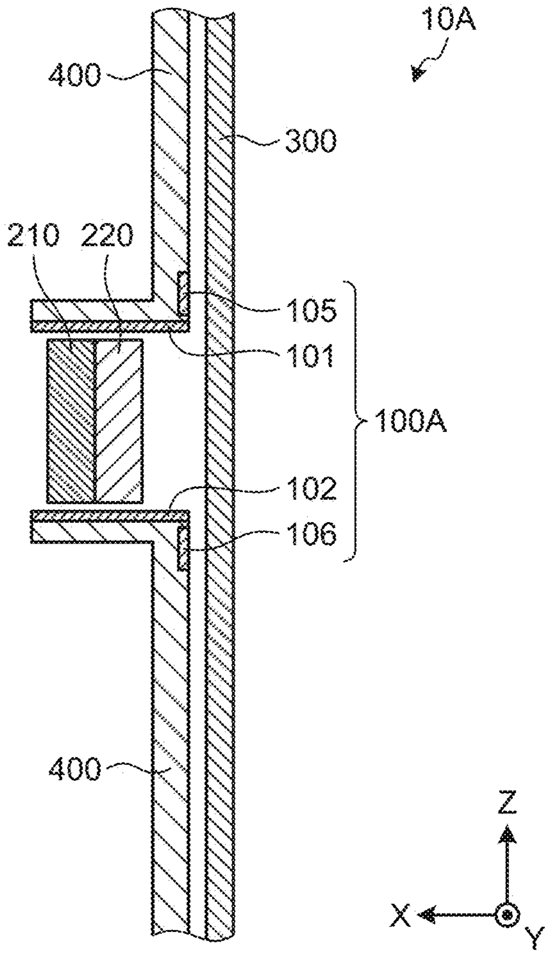
FIG. 14 is a schematic diagram illustrating another example of the wireless device according to the second embodiment of the present disclosure.

FIG. 14 is a schematic diagram illustrating another example of the wireless device 10A according to the second embodiment of the present disclosure. Here, the metal plates 101 to 104 (in FIG. 14, the metal plates 103 and 104 are not illustrated) are formed by a method different from the metal plates 105 to 108 (in FIG. 14, the metal plates 107 and 108 are not illustrated) of the metal member 100A.

For example, the metal plates 101 to 104 are formed as a cylindrical box made of, for example, copper and is mounted to the frame 400. The metal plates 105 to 108 are formed using the above-described LDS. In this configuration, a gap can be formed between the metal plates 101 to 104 and the metal plates 105 to 108, but the gap is desirably as small as possible.

In this way, the metal plates 101 to 108 do not need to be formed by the same method, and may be formed by different methods. In this configuration, a gap may be formed between the metal plates 101 to 108.

3. THIRD EMBODIMENT

Figure 15:
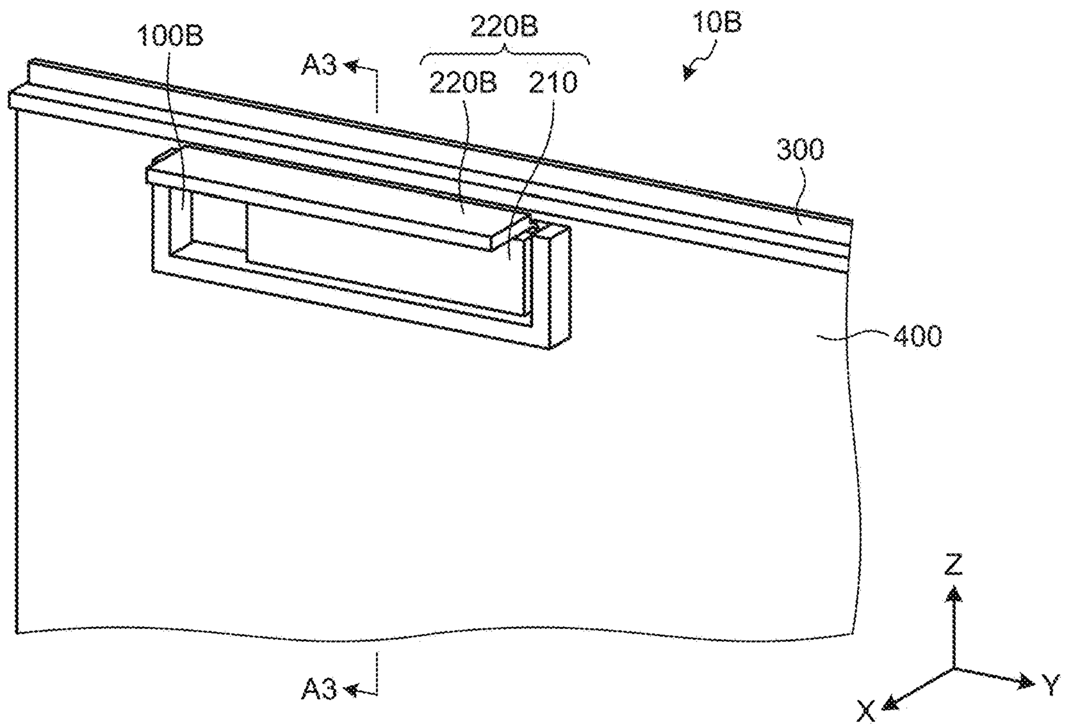
FIG. 15 is a diagram illustrating an exemplary schematic configuration of a wireless device according to a third embodiment of the present disclosure.
Figure 16:
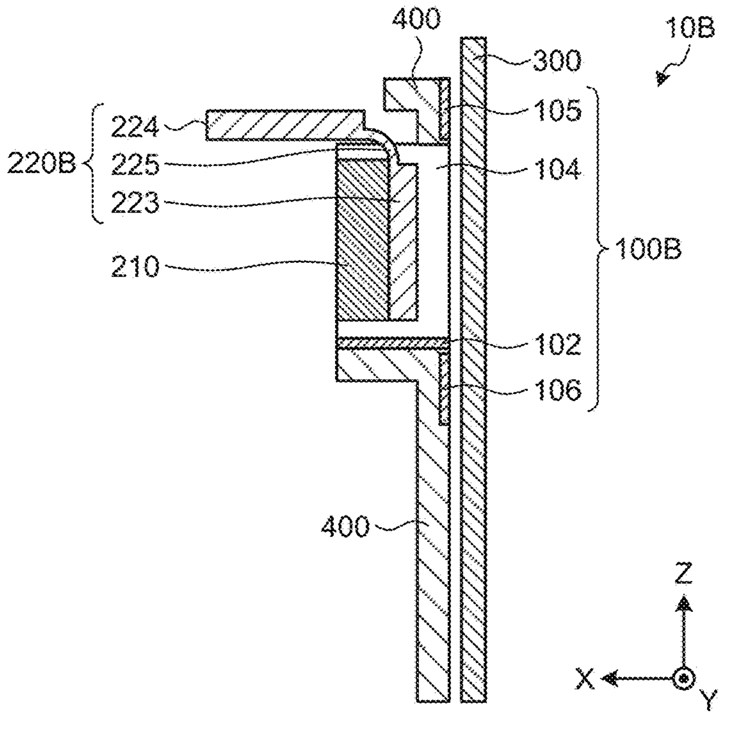
FIG. 16 is a cross-sectional view taken along line A3-A3 of FIG. 15.
Figure 17:
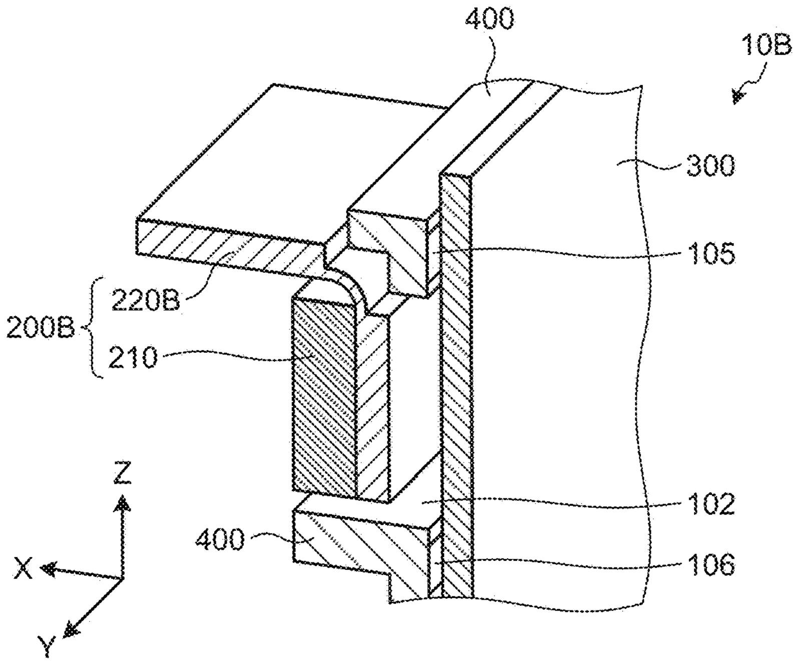
FIG. 17 is a perspective view of the cross-section taken along line A3-A3 of FIG. 15.

FIG. 15 is a diagram illustrating an exemplary schematic configuration of a wireless device 10B according to a third embodiment of the present disclosure. FIG. 16 is a cross-sectional view taken along line A3-A3 of FIG. 15. FIG. 17 is a perspective view of the cross-section taken along line A3-A3 of FIG. 15.

The wireless device 10B illustrated in FIGS. 15 to 17 has the same configuration as that of the wireless device 10A illustrated in FIGS. 6 and 7 except that an antenna module 200B is included instead of the antenna module 200 and a metal member 100B has a shape that is different from that of the metal member 100A.

The antenna module 200B includes an L-shaped antenna unit 220B. The antenna unit 220B includes radiation units 223 and 224. As in the antenna unit 220, the radiation units 223 and 224 include, for example, a plurality of patch antennas 222 (see FIG. 3).

The radiation units 223 and 224 are arranged into an L shape so that main radiation directions thereof are substantially orthogonal to each other. In the example of FIG. 16, the radiation unit 223 is arranged so that the main radiation direction faces the front side of the high dielectric constant member 300 (negative X-axis direction). The radiation unit 224 is arranged so that the main radiation direction faces a side surface of the high dielectric constant member 300 (positive Z-axis direction). The radiation units 223 and 224 are connected by, for example, a connection portion 225. For example, a power supply line (not illustrated) for supplying power to the plurality of patch antennas 222 included in the radiation unit 224 can be arranged in the connection portion 225.

The antenna module 200B is arranged, for example, at an end portion of the wireless device 10B. As a result, radio waves are emitted from a back surface and a side surface of the wireless device 10B.

At this time, as described above, the high dielectric constant member 300 such as glass is provided on the back surface of the wireless device 10B. The side surface of the wireless device 10B is provided with a member, such as resin (not illustrated, and hereinafter, also described as a low dielectric constant member), having a lower relative dielectric constant than that of the glass. As described above, the housing of the wireless device 10B can be formed of members having different dielectric constants.

When the main radiation direction of the main radiation unit faces the low dielectric constant member as in the radiation unit 224, gain degradation of the radio wave radiated from the main radiation unit is small. On the other hand, when the main radiation direction of the main radiation unit faces the high dielectric constant member 300 having a larger relative dielectric constant than that of the low dielectric constant member as in the radiation unit 223, the gain degradation of the radio wave radiated from the main radiation unit increases.

Therefore, in the wireless device 10B of the present embodiment, the metal member 100B is arranged to surround the radiation unit 223. The metal member 100B has a configuration similar to that of the metal member 100A illustrated in FIGS. 8 to 11 except that the metal plate 101 is not provided.

As described above, the metal member 110B does not include the metal plate 101. As illustrated in FIGS. 16 and 17, the radiation units 223 and 224 are connected by the connection portion 225. For example, the power supply line (not illustrated) or the like is arranged in the connection portion 225.

The metal member 110B includes the metal plates 102 to 104 that cover side surfaces other than a side surface on which the connection portion 225 of the antenna module 200B is arranged. The metal member 110B includes the metal plates 105 to 108 arranged around the radiation unit 223 of the antenna unit 220B so as to be substantially parallel to the high dielectric constant member 300.

As described above, the metal member 100B does not include the metal plate 101. As a result, the metal member 100B can cover the periphery of the antenna module 200B without hindering arrangement of the connection portion 225 of the antenna module 200B by the metal plate 101.

In the wireless device 10B, the metal member 100B is configured to suppress the gain degradation of the antenna module 200B, particularly, the gain degradation of the radiation unit 223.

4. OTHER EMBODIMENTS (Metal Frame)

In the embodiments described above, the metal members 100, 100A, and 100B are each formed as the box made of copper and mounted to the frame 400 made of plastic, but the method of forming each of the metal members 100, 100A, and 100B is not limited thereto. For example, the metal member 100 can be formed as a frame of the wireless device 10.

Figure 18:
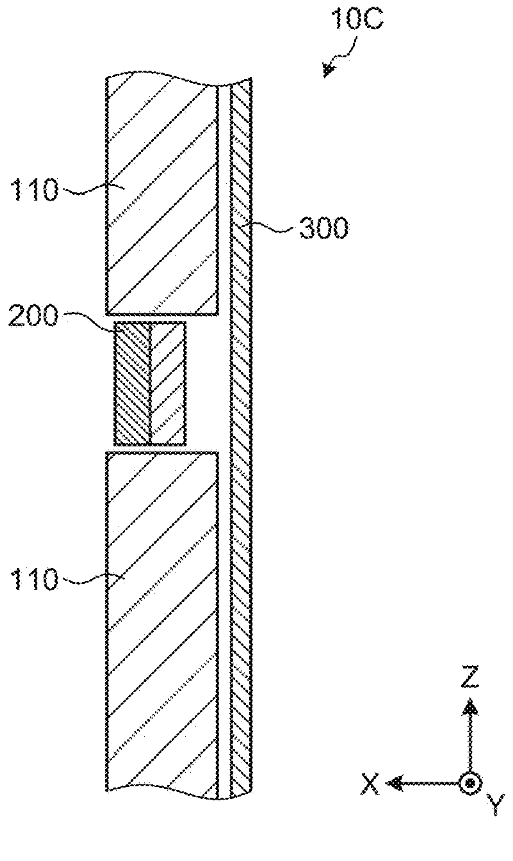
FIG. 18 is a diagram illustrating an exemplary schematic configuration of a wireless device according to another embodiment of the present disclosure.

FIG. 18 is a diagram illustrating an exemplary schematic configuration of a wireless device 10C according to another embodiment of the present disclosure. The wireless device 10C illustrated in FIG. 18 has a configuration similar to that of the wireless device 10 illustrated in FIGS. 1 and 2 except that a metal frame 110 is provided instead of the metal member 100.

As illustrated in FIG. 18, the metal frame 110 covering the periphery of the antenna module 200 makes it possible for the wireless device 10C to suppress the gain degradation of the antenna module 200, as in the wireless device 10 of FIGS. 1 and 2.

(Covering Antenna Unit 220)

In the embodiments described above, the metal plates 101 to 104 have covered the side surfaces of the antenna module 200, but the metal plates 101 to 104 do not need to entirely cover the side surfaces of the antenna module 200. For example, the metal plates 101 to 104 may cover the side surfaces of the antenna unit 220 of the antenna module 200 and may not cover the control unit 210.

Figure 19:
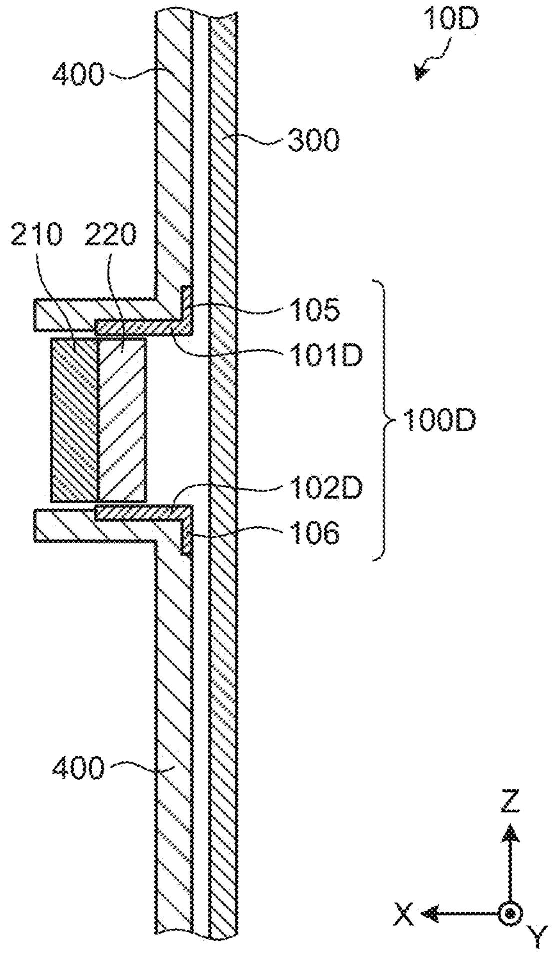
FIG. 19 is a diagram illustrating an exemplary schematic configuration of a wireless device according to another embodiment of the present disclosure.

FIG. 19 is a diagram illustrating an exemplary schematic configuration of a wireless device 10D according to another embodiment of the present disclosure. The wireless device 10D illustrated in FIG. 19 has a configuration similar to that of the wireless device 10 illustrated in FIGS. 1 and 2 except for the sizes of metal plates 101D to 104D (the metal plates 103D and 104D are not illustrated).

The metal plates 101D to 104D are smaller in height (transverse (X-axis direction) length) than those of the metal plates 101 to 104. More specifically, the metal plates 101D to 104D are arranged so that one side of each of the metal plates 101D to 104D is substantially the same as an end side of the antenna unit 220 (an end side of the antenna unit 220 makes contact with the control unit 210).

The control unit 210 is shielded as described above, and has a structure in which the radio waves are less likely to leak to the outside. Therefore, the metal plates 101D to 104D do not necessarily cover the periphery of the control unit 210. The antenna unit 220, the periphery of which is covered with a metal member 100D, makes it possible for the wireless device 10D to suppress the gain degradation of the antenna module 200.

(Contact with Antenna Module)

In the embodiments described above, the metal plates 101 to 104 have been arranged with a predetermined gap around the antenna module 200, but the arrangement of the metal plates 101 to 104 is not limited thereto. The metal plates 101 to 104 may be arranged so as to be in contact with the antenna module 200.

Figure 20:
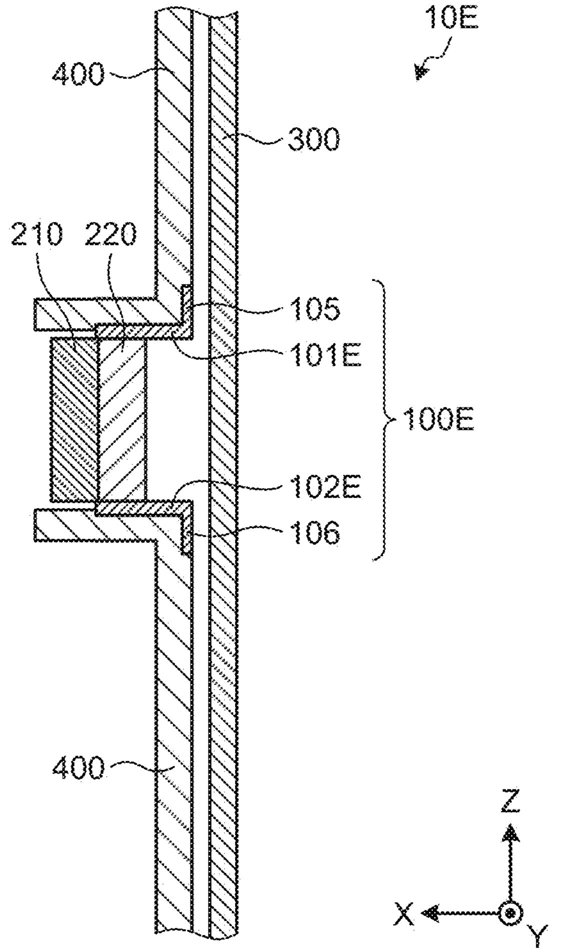
FIG. 20 is a diagram illustrating an exemplary schematic configuration of a wireless device according to another embodiment of the present disclosure.

FIG. 20 is a diagram illustrating an exemplary schematic configuration of a wireless device 10E according to another embodiment of the present disclosure. The wireless device 10E illustrated in FIG. 20 has a configuration similar to that of the wireless device 10D illustrated in FIG. 19 except for the arrangement of metal plates 101E to 104E (the metal plates 103E and 104E are not illustrated).

The metal plates 101E to 104E are arranged so as to be partially in contact with the antenna module 200. In other words, in the example of FIG. 20, the distance d1 between the metal plates 101E to 104E and the antenna module 200 is d1=0.

A metal member 100E may be arranged so as to be in contact with the antenna module 200 as long as the metal member 100E can be stably connected to a shield portion (not illustrated) of the control unit 210.

In this way, even if the metal plates 101E to 104E are arranged so as to be in contact with the antenna module 200, the wireless device 10E is configured to suppress the gain degradation of the antenna module 200.

(Oblique Arrangement of Metal Member 100F)

In the embodiments described above, the metal plates 101 to 104 have been arranged substantially perpendicular to the high dielectric constant member 300, but the arrangement of the metal plates 101 to 104 is not limited thereto. The metal plates 101 to 104 may be arranged obliquely relative to the high dielectric constant member 300.

Figure 21:
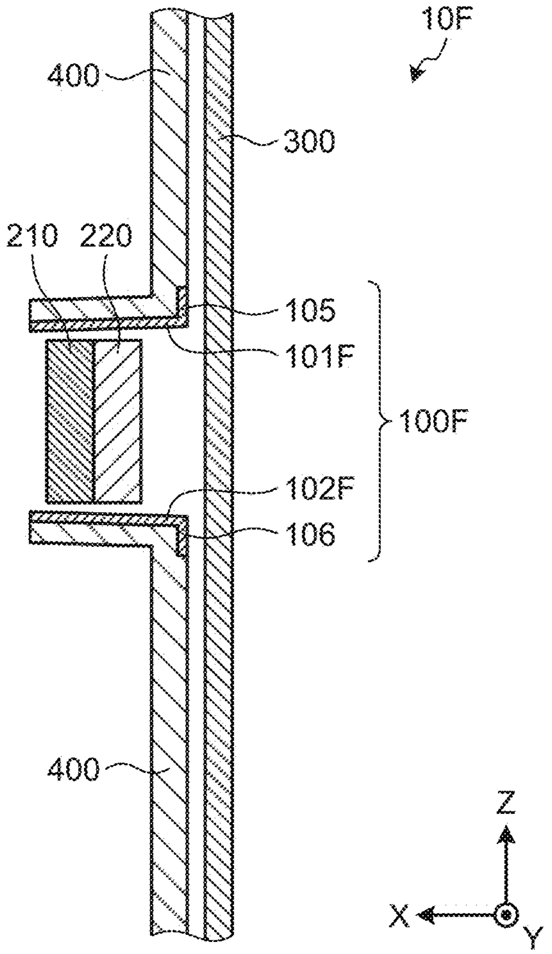
FIG. 21 is a diagram illustrating an exemplary schematic configuration of a wireless device according to another embodiment of the present disclosure.

FIG. 21 is a diagram illustrating an exemplary schematic configuration of a wireless device 10E according to another embodiment of the present disclosure. A wireless device 10F illustrated in FIG. 21 has a configuration similar to that of the wireless device 10 illustrated in FIGS. 1 and 2 except for the arrangement of metal plates 101F to 104F (the metal plates 103F and 104F are not illustrated).

The metal plates 101F to 104F are arranged obliquely relative to the high dielectric constant member 300. In the example of FIG. 21, each of the metal plates 101F to 104F is arranged so that a distance between each metal plate and the antenna module 200 increases as each of the metal plates 101F to 104F is closer to the high dielectric constant member 300. In other words, the metal plates 101F to 104F are arranged so that an opening portion of a metal member 100F near the high dielectric constant member 300 is larger than an opening portion near the control unit 210.

In this way, even when the metal plates 101F to 104F are arranged obliquely relative to the high dielectric constant member 300, the wireless device 10F is configured to suppress the gain degradation of the antenna module 200.

Note that even when the metal plates 101F to 104F are arranged obliquely relative to the high dielectric constant member 300 in this way, the metal plates 101F to 104F are desirably arranged closer to the antenna module 200. For example, the metal plates 101F to 104F are preferably arranged so that the distance between each of the metal plates 101F to 104F and the antenna module 200 is equal to or less than 1/10 wavelength of the operation frequency of the antenna module 200.

In addition, here, each of the metal plates 101F to 104F are arranged so that the distance between each metal plate and the antenna module 200 increases as each of the metal plates are closer to the high dielectric constant member 300, but the arrangement of the metal plates 101F to 104F is not limited thereto. The metal plates 101F to 104F may be arranged so that the distance between each metal plate and the antenna module 200 decreases as each of the metal plates 101F to 104F is closer to the high dielectric constant member 300. In other words, the metal plates 101F to 104F can be arranged so that the opening portion of the metal member 100F near the high dielectric constant member 300 is smaller than the opening portion near the control unit 210.

In this way, the distance d1 (see FIG. 2) between each of the metal plates 101 to 104 and the antenna module 200 does not need to have a constant value, and can have a plurality of values. In other words, the metal plates 101 to 104 can be arranged obliquely relative to the antenna module 200 (or the high dielectric constant member 300). Alternatively, the metal plates 101 to 104 can be stepped.

(Cutout or Like)

In the embodiments described above, the metal plates 101 to 108 have the substantially rectangular shapes, but the shapes of the metal plates 101 to 104 are not limited thereto. The metal plates 101 to 108 may be formed so that corner portions of the metal plates 101 to 108 are rounded, and cutouts or the like may be formed in the metal plates 101 to 108.

Figure 22:
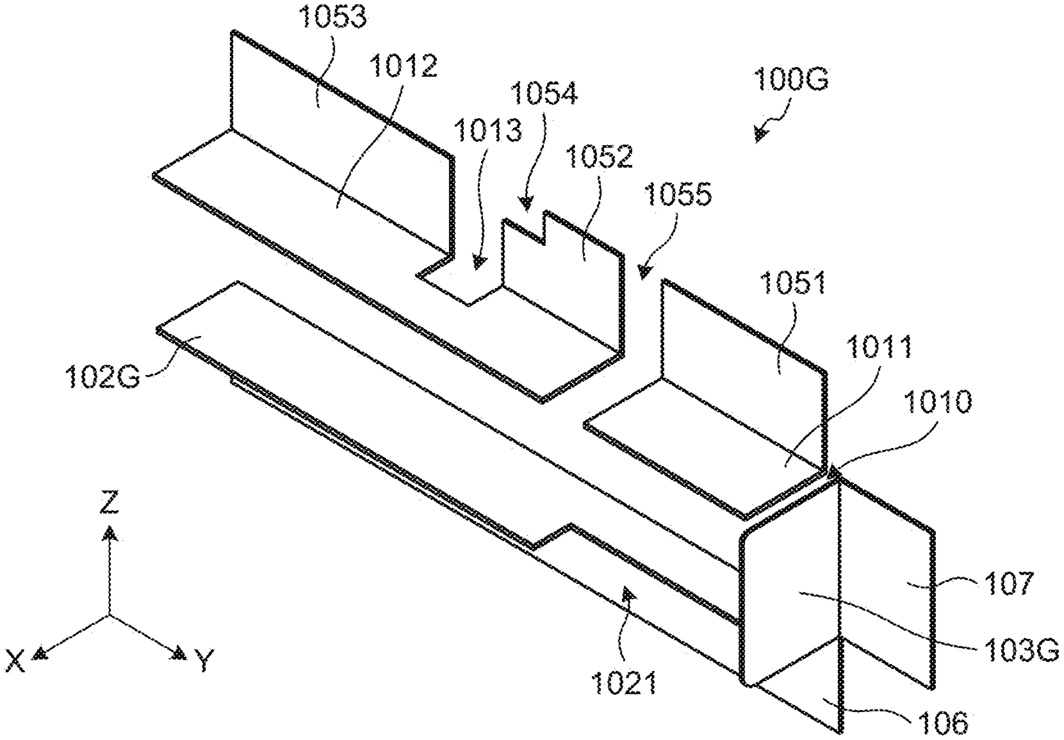
FIG. 22 is a diagram illustrating an exemplary schematic configuration of a metal member according to another embodiment of the present disclosure.

FIG. 22 is a diagram illustrating an exemplary schematic configuration of a metal member 100G according to another embodiment of the present disclosure. The metal member 100G illustrated in FIG. 22 does not have the metal plates 104 and 108, but has metal plates 1011 and 1012 instead of the metal plate 101. Furthermore, the metal member 100G includes a metal plate 102G instead of the metal plate 102, a metal plate 103G instead of the metal plate 103, and metal plates 1051 to 1053 instead of the metal plate 105.

The metal plates 1011 and 1012 are arranged to partially cover a side surface of the antenna module 200. The metal plate 1011 makes contact with the metal plate 1051 at an end side in the negative X-axis direction. The metal plate 1011 is not in contact with the metal plates 1012 and 103G. A predetermined gap 1010 is provided between the metal plate 1011 and the metal plate 1012. The predetermined gap 1010 is provided between the metal plate 1011 and the metal plate 103G.

The metal plate 1012 has a cutout 1013 on one side in the negative X-axis direction. Furthermore, the metal plate 1012 makes contact with the metal plates 1052 and 1053 on one side in the negative X-axis direction. The metal plate 1052 has a cutout 1054 at a corner near the metal plate 1053.

A gap 1055 is provided between the metal plates 1011 and 1051 and the metal plates 1012 and 1052.

The metal plate 102G includes a cutout 1021 on a side making contact with the metal plate 103G. The metal plate 103G has corners on a side not in contact with the metal plate 107 are rounded. Furthermore, the metal plate 103G has a height (length in the X-axis direction) that is larger than the heights (lengths in the X-axis direction) of the other metal plates 1011, 1012, and 102G.

In this way, the shape and the number of the metal plates constituting the metal member 100G can be appropriately changed. However, in order to suppress the gain degradation of the antenna module 200, it is desirable for the metal plates covering at least some of the side surfaces of the antenna module 200 are arranged closer to the high dielectric constant member 300.

For example, the distance d3 between an end side of each of the metal plates 1011, 1012, 102G, and 103G and the high dielectric constant member 300 is desirably smaller than the distance d2 between the main radiation unit 221 of the antenna module 200 and the high dielectric constant member 300. Furthermore, the distance d3 between each of the metal plates 1051 to 1053 and the high dielectric constant member 300 is desirably smaller than the distance d2 between the main radiation unit 221 of the antenna module 200 and the high dielectric constant member 300.

In addition, at least some of the side surfaces of the antenna module 200 are preferably covered with the metal member 100G, and some of the metal plates (e.g., metal plates 104 and 108) or some of the metal plates (e. g., cutout 1021 or the like) can be omitted.

However, in order to suppress the gain degradation of the antenna module 200, it is desirable not to omit all of the metal plates (e.g., metal plates 101 and 102) covering the side surfaces in the longitudinal direction of the antenna module 200. In other words, the metal member 100G desirably has a metal plate that at least partially covers a side surface in the longitudinal direction of the antenna module 200. This is because more radio waves are radiated from the longitudinal direction of the antenna module 200. The metal plates are arranged to at least partially cover the side surfaces in the longitudinal direction of the antenna module 200, and therefore, the wireless device 10 is configured to suppress the gain degradation of the antenna module 200.

Furthermore, in the first and second embodiments described above, the metal plates 105 to 108 have been provided around the antenna module 200, but a metal plate provided around the antenna module 200 is not limited thereto. Instead of the metal plates 105 to 108, for example, a substantially rectangular metal plate having an opening may be arranged around the antenna module 200. The antenna module 200 is arranged in the opening. In other words, the metal plates 105 to 108 may be formed of one metal plate.

5. CONCLUSION

Although the embodiments of the present disclosure have been described above, the technical scope of the present disclosure is not limited to the embodiments described above and various changes can be made without departing from the spirit and scope of the present disclosure. Moreover, the component elements of different embodiments and modifications may be suitably combined with each other.

Furthermore, the effects in the embodiments described herein are merely examples, the present disclosure is not limited to these effects, and other effects may also be provided.

Note that the present technology can also have the following configurations.

(1)

A device comprising:

a first metal plate that is arranged to cover at least part of a first side surface in a longitudinal direction of an antenna module having a main radiation unit of substantially rectangular shape; and a second metal plate that is arranged to cover at least part of a second side surface in the longitudinal direction of the antenna module, the second side surface being different from the first side surface, wherein the antenna module is arranged such that the main radiation unit faces a high dielectric constant member of a housing, a first distance between an end side of the first metal plate and the high dielectric constant member is smaller than a distance between the main radiation unit and the high dielectric constant member, and a second distance between an end side of the second metal plate and the high dielectric constant member is smaller than the distance between the main radiation unit and the high dielectric constant member.

(2)

The device according to (1), further comprising:

a third metal plate that is arranged substantially parallel to the high dielectric constant member, on a side of the first side surface of a periphery of the antenna module; and a fourth metal plate that is arranged substantially parallel to the high dielectric constant member, on a side of the second side surface of the periphery of the antenna module, wherein a third distance between the third metal plate and the high dielectric constant member is smaller than the distance between the main radiation unit and the high dielectric constant member, and a fourth distance between the fourth metal plate and the high dielectric constant member is smaller than the distance between the main radiation unit and the high dielectric constant member.

(3)

The device according to (2), wherein the third metal plate has an end side connected to the end side of the first metal plate, and the fourth metal plate has an end side connected to the end side of the second metal plate.

(4)

The device according to any one of (1) to (3), wherein at least one of the first metal plate and the second metal plate has one or more cutouts.

(5)

The device according to any one of (1) to (4), further comprising a fifth metal plate that is arranged to cover at least part of a third side surface in a transverse direction of the antenna module, wherein a fifth distance between an end side of the fifth metal plate and the high dielectric constant member is smaller than the distance between the main radiation unit and the high dielectric constant member.

(6)

The device according to (5), further comprising a sixth metal plate that is arranged substantially parallel to the high dielectric constant member, on a side of the third side surface of a periphery of the antenna module, wherein a sixth distance between the sixth metal plate and the high dielectric constant member is smaller than the distance between the main radiation unit and the high dielectric constant member.

(7)

The device according to (6), wherein the sixth metal plate has an end side connected to the end side of the fifth metal plate.

(8)

The device according to any one of (5) to (7), further comprising a seventh metal plate that is arranged to cover at least part of a fourth side surface in the transverse direction of the antenna module, the fourth side surface being different from the third side surface, wherein a seventh distance between an end side of the seventh metal plate and the high dielectric constant member is smaller than the distance between the main radiation unit and the high dielectric constant member.

(9)

The device according to (8), further comprising an eighth metal plate that is arranged substantially parallel to the high dielectric constant member, on a side of the fourth side surface of a periphery of the antenna module, wherein an eighth distance between the eighth metal plate and the high dielectric constant member is smaller than the distance between the main radiation unit and the high dielectric constant member.

(10)

The device according to (9), wherein the eighth metal plate has an end side connected to the end side of the seventh metal plate.

(11)

The device according to any one of (1) to (10), wherein the antenna module transmits and/or receives a high frequency signal in a millimeter-wave band or higher.

(12)

The device according to any one of (1) to (11), wherein the antenna module has at least one patch antenna element.

REFERENCE SIGNS LIST

10 WIRELESS DEVICE
100 METAL MEMBER
101, 102, 103, 104, 105, 106, 107, 108 METAL PLATE
200 ANTENNA MODULE
210 CONTROL UNIT
220 ANTENNA UNIT
221 MAIN RADIATION UNIT
300 HIGH DIELECTRIC CONSTANT MEMBER

The invention claimed is:

1. A device comprising:

a first metal plate that is arranged to cover at least part of a first side surface in a longitudinal direction of an antenna module having a main radiation unit of substantially rectangular shape; and a second metal plate that is arranged to cover at least part of a second side surface in the longitudinal direction of the antenna module, the second side surface being different from the first side surface, wherein the antenna module is arranged such that the main radiation unit faces a high dielectric constant member of a housing, a first distance between an end side of the first metal plate and the high dielectric constant member is smaller than a distance between the main radiation unit and the high dielectric constant member, and a second distance between an end side of the second metal plate and the high dielectric constant member is smaller than the distance between the main radiation unit and the high dielectric constant member.

2. The device according to claim 1, further comprising:

a third metal plate that is arranged substantially parallel to the high dielectric constant member, on a side of the first side surface of a periphery of the antenna module; and a fourth metal plate that is arranged substantially parallel to the high dielectric constant member, on a side of the second side surface of the periphery of the antenna module, wherein a third distance between the third metal plate and the high dielectric constant member is smaller than the distance between the main radiation unit and the high dielectric constant member, and a fourth distance between the fourth metal plate and the high dielectric constant member is smaller than the distance between the main radiation unit and the high dielectric constant member.

3. The device according to claim 2, wherein the third metal plate has an end side connected to the end side of the first metal plate, and the fourth metal plate has an end side connected to the end side of the second metal plate.

4. The device according to claim 1, wherein at least one of the first metal plate and the second metal plate has one or more cutouts.

5. The device according to claim 1, further comprising a fifth metal plate that is arranged to cover at least part of a third side surface in a transverse direction of the antenna module, wherein a fifth distance between an end side of the fifth metal plate and the high dielectric constant member is smaller than the distance between the main radiation unit and the high dielectric constant member.

6. The device according to claim 5, further comprising a sixth metal plate that is arranged substantially parallel to the high dielectric constant member, on a side of the third side surface of a periphery of the antenna module, wherein a sixth distance between the sixth metal plate and the high dielectric constant member is smaller than the distance between the main radiation unit and the high dielectric constant member.

7. The device according to claim 6, wherein the sixth metal plate has an end side connected to the end side of the fifth metal plate.

8. The device according to claim 5, further comprising a seventh metal plate that is arranged to cover at least part of a fourth side surface in the transverse direction of the antenna module, the fourth side surface being different from the third side surface, wherein a seventh distance between an end side of the seventh metal plate and the high dielectric constant member is smaller than the distance between the main radiation unit and the high dielectric constant member.

9. The device according to claim 8, further comprising an eighth metal plate that is arranged substantially parallel to the high dielectric constant member, on a side of the fourth side surface of a periphery of the antenna module, wherein an eighth distance between the eighth metal plate and the high dielectric constant member is smaller than the distance between the main radiation unit and the high dielectric constant member.

10. The device according to claim 9, wherein the eighth metal plate has an end side connected to the end side of the seventh metal plate.

11. The device according to claim 1, wherein the antenna module transmits and/or receives a high frequency signal in a millimeter-wave band or higher.

12. The device according to claim 1, wherein the antenna module has at least one patch antenna element.

* * * * *